United States Patent
Zebarjad et al.

(10) Patent No.: US 9,820,565 B2
(45) Date of Patent: *Nov. 21, 2017

(54) HEIGHT ADJUSTABLE TABLE

(71) Applicant: Teknion Limited, Toronto (CA)

(72) Inventors: Hamid Zebarjad, Richmaon Hill (CA); Adam Douglas Haworth Sinclair, Pickering (CA); Hanna Shaheen, North York (CA); Bin Yu, Ajax (CA)

(73) Assignee: Teknion Limited, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/265,150

(22) Filed: Sep. 14, 2016

(65) Prior Publication Data
US 2017/0000256 A1 Jan. 5, 2017

Related U.S. Application Data

(63) Continuation of application No. 14/706,488, filed on May 7, 2015, now Pat. No. 9,510,670.
(Continued)

(51) Int. Cl.
*A47B 9/00* (2006.01)
*A47B 9/02* (2006.01)
(Continued)

(52) U.S. Cl.
CPC ............ *A47B 9/02* (2013.01); *A47B 9/00* (2013.01); *A47B 9/12* (2013.01); *A47B 9/20* (2013.01); *F16M 11/24* (2013.01)

(58) Field of Classification Search
CPC .... A47B 9/02; A47B 9/12; A47B 9/18; A47B 9/20; A47B 9/00; A47B 9/04;
(Continued)

(56) References Cited

U.S. PATENT DOCUMENTS 3,820,176 A 6/1974 Feiertag
4,130,069 A 12/1978 Evans et al.
(Continued)

FOREIGN PATENT DOCUMENTS

DE 1913456 4/1965
DE 1554359 11/1969
(Continued)

OTHER PUBLICATIONS

Humanscale Corp. Float Table, brochure published online by Humanscale Corp., www.humanscale.com/float, accessed online within Canada prior to May 8, 2014.
(Continued)

*Primary Examiner* — Daniel J Troy
*Assistant Examiner* — Andres F Gallego
(74) *Attorney, Agent, or Firm* — Bereskin & Parr LLP/S.E.N.C.R.L., s.r.l.

(57) ABSTRACT

A height-adjustable table includes a frame supporting a work surface; a pair of lower legs supporting the frame; a pulley mechanism coupling the frame and the lower legs for vertically moving the frame relative to the lower legs; and a spring located within a passage extending through the frame. The spring has a fixed end secured to the frame and a movable end movable relative to the frame over a first distance for exerting a force over the first distance. The table further includes a block-and-tackle assembly located within the passage. The block-and-tackle assembly couples the movable end of the spring to the pulley mechanism for transferring the force exerted by the spring over the first distance to vertical movement of the frame relative to the lower legs over a second distance greater than the first distance.

9 Claims, 13 Drawing Sheets

Related U.S. Application Data

(60) Provisional application No. 61/990,307, filed on May 8, 2014.

(51) Int. Cl.
  *A47B 9/12* (2006.01)
  *A47B 9/20* (2006.01)
  *F16M 11/24* (2006.01)

(58) Field of Classification Search
  CPC ........ F16M 11/28; F16M 11/26; F16M 11/10; F16M 11/24; F16M 11/17; F16M 13/00
  See application file for complete search history.

(56) References Cited

U.S. PATENT DOCUMENTS

| | | | |
|---|---|---|---|
| 5,682,825 A | 11/1997 | Manner | |
| 5,706,739 A | 1/1998 | Shaheen et al. | |
| 5,797,331 A * | 8/1998 | Watt | A47B 9/02 108/146 |
| 7,412,931 B2 * | 8/2008 | Seidl | A47B 9/02 108/147 |
| 9,038,549 B1 * | 5/2015 | Zebarjad | A47B 9/02 108/147 |
| 9,332,836 B1 * | 5/2016 | Zebarjad | |

FOREIGN PATENT DOCUMENTS

| | | |
|---|---|---|
| DE | 1554360 | 11/1969 |
| DE | 8310826 | 7/1983 |
| DE | 3406669 | 8/1985 |
| DE | 19749494 | 5/1999 |
| DE | 10216774 | 10/2003 |
| EP | 0460685 | 12/1991 |
| EP | 0963717 | 12/1999 |
| EP | 2250925 | 11/2010 |
| EP | 1987734 | 12/2010 |
| IE | 19756725 | 7/1999 |

OTHER PUBLICATIONS

Humanscale Corp. Float Table, pictures taken on Mar. 12, 2014 in Scarborough, Ontario, Canada.

* cited by examiner

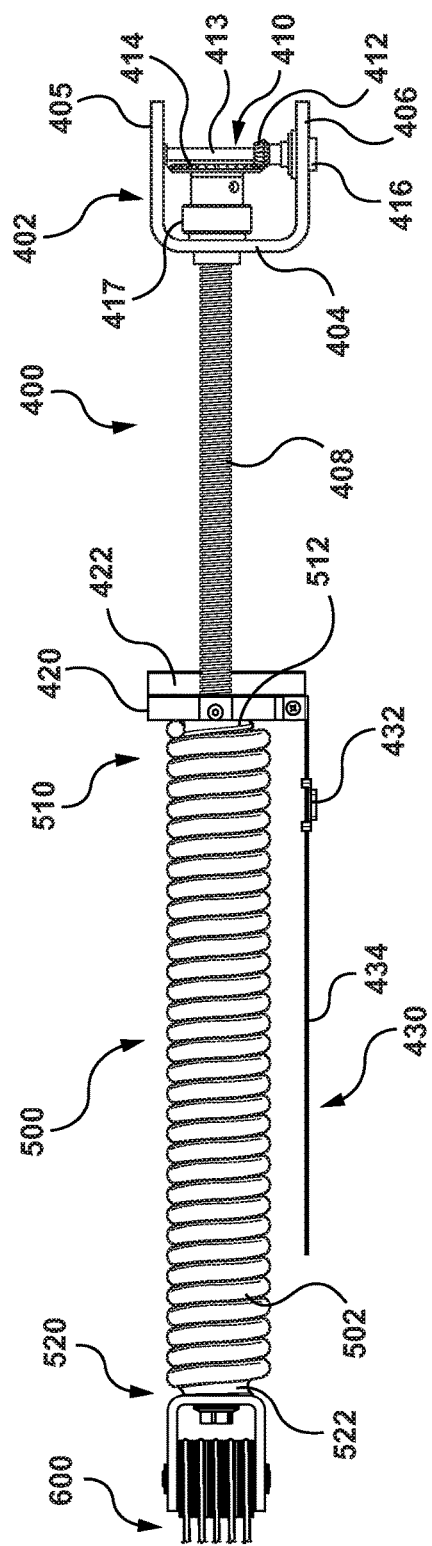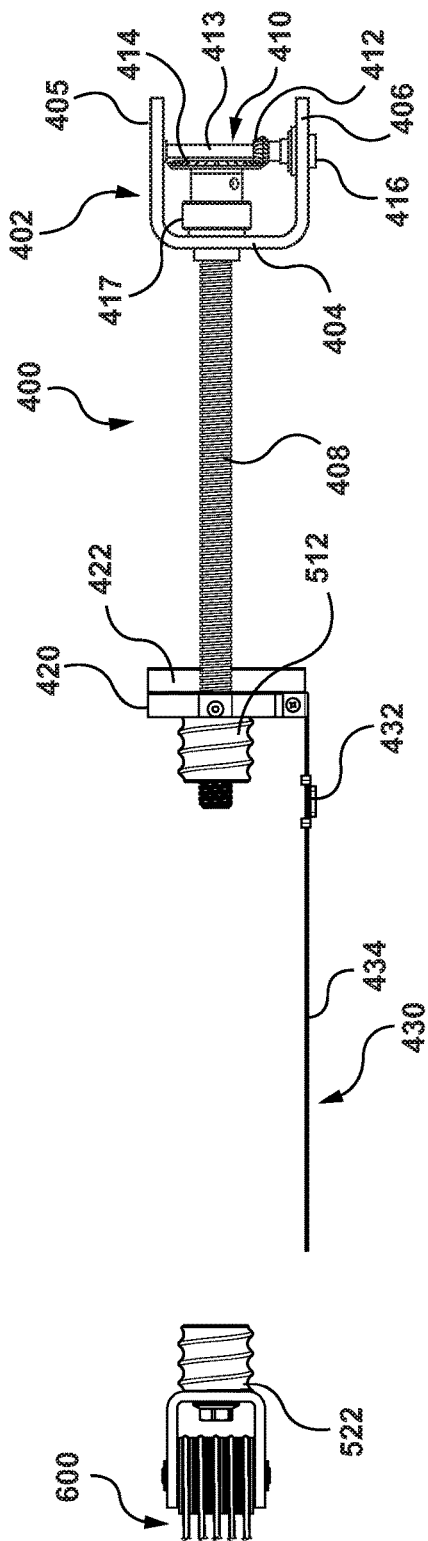

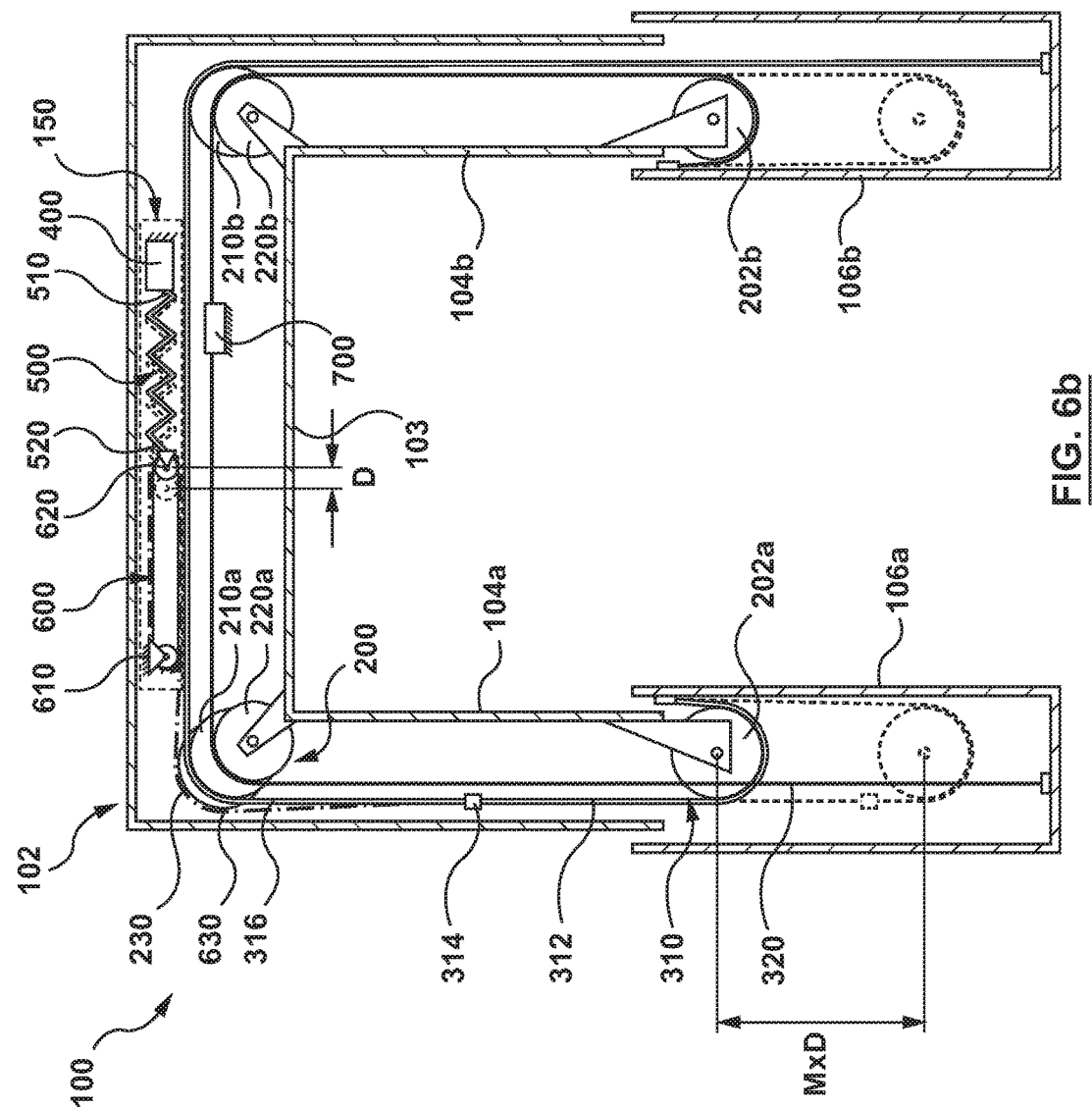

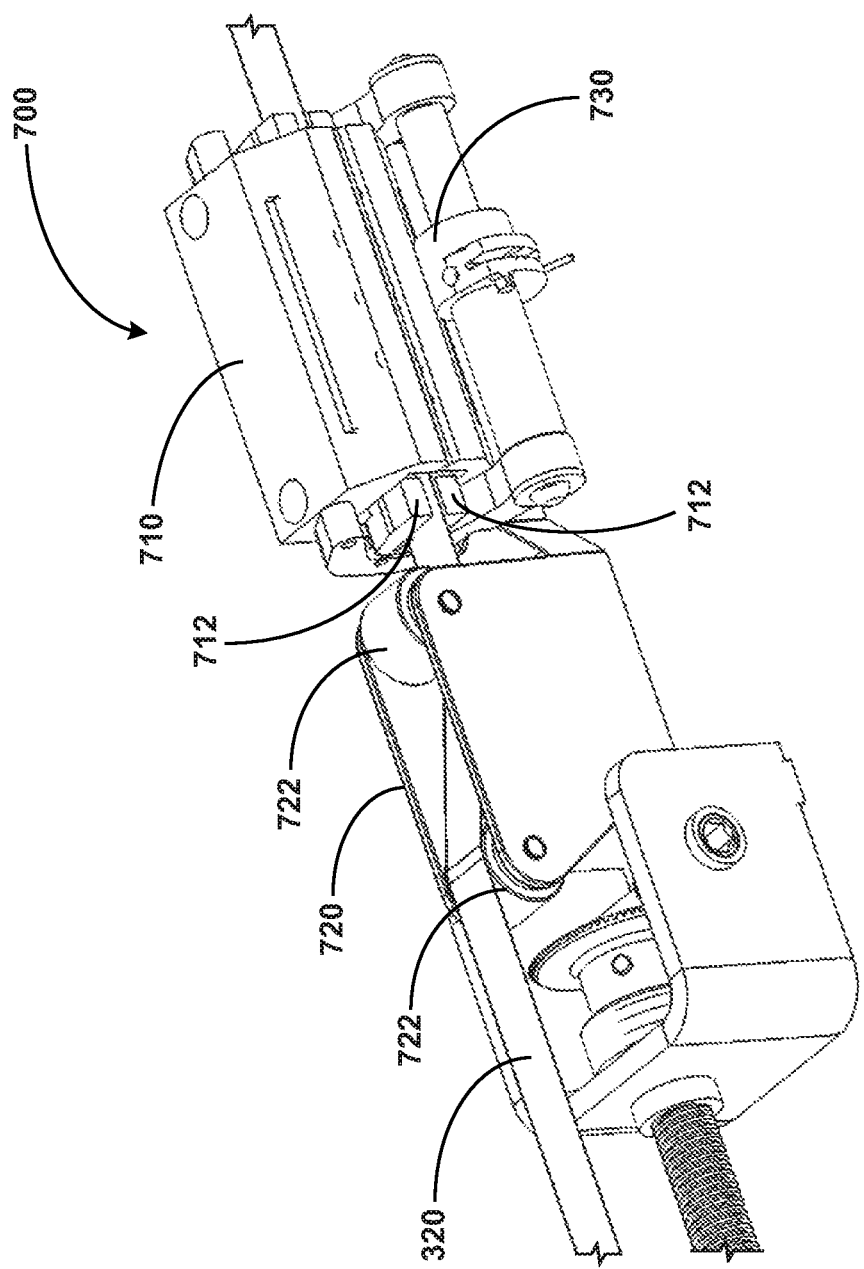

HEIGHT ADJUSTABLE TABLE

CROSS-REFERENCE TO RELATED APPLICATIONS

This application is a continuation of U.S. patent application Ser. No. 14/706,488, filed on May 7, 2015 (now U.S. Pat. No. 9,510,670, issued on Dec. 6, 2016), which claims the benefit of U.S. Provisional Application No. 61/990,307, filed on May 8, 2014, both of which are incorporated herein by reference in their entirety.

FIELD

The various embodiments described herein generally relate to height-adjustable tables and related apparatuses, and in particular to tables having a work surface that can be adjusted to varying heights and that use a variable-load counter-balance mechanism to assist in adjusting the height of the work surface.

BACKGROUND

A mechanical height-adjustable table employs a non-electrical counter-balance mechanism to assist in raising and lowering a work surface of the table. The lifting power to raise the work surface typically comes from a mechanical spring. The spring load can be adjusted to balance the load exerted by the work surface (including items resting on the work surface) in order to reduce or eliminate the application of force by the user to raise the work surface (i.e. making the work surface feel weightless).

Existing height-adjustable tables often utilize a fixed cross-beam or panel that extends between the table's lower legs to house components of the counter-balance mechanism. An example of such a table is described in U.S. Pat. No. 5,706,739. Further, existing designs often utilize variable radius force-exchange wheels, such as snail cams, to adjust the load curve of the spring.

SUMMARY

In a broad aspect, at least one embodiment described herein provides a height-adjustable table. The height-adjustable table can include a work surface and a vertically movable frame adapted to support the work surface. The frame can include a cross-member, a first upper leg, and a second upper leg. The upper legs can be connected to the cross-member, spaced apart, and extend downwardly from the cross-member. The frame can define a passage extending through the first upper leg, the cross member, and the second upper leg.

The table can further include a first lower leg and a second lower leg. The first upper leg can telescope within the first lower leg, and the second upper leg can telescope within the second lower leg.

The table can further include a pulley mechanism. The pulley mechanism can include a first plurality of pulleys located in the passage, a first tension line, and a second tension line. The first and second tension lines can pass through the first plurality of pulleys. The first line can be adapted for vertically moving the first upper leg within the first lower leg and the second line can be adapted for vertically moving the second upper leg within the second lower leg.

The table can further include a spring located in the passage. The spring can have a fixed end connected to the frame and a movable end adapted to move a first distance relative to the fixed end. The spring can be adapted to exert an upward force on the frame over the first distance.

The table can further include a block-and-tackle assembly located in the passage. The block-and-tackle assembly can include a fixed block having a second plurality of pulleys and being connected to the frame; a movable block having a third plurality of pulleys and being connected to the movable end of the spring such that a displacement of the movable end of the spring relative to its fixed end results in a displacement of the movable block relative to the fixed block; and a third tension line threaded between the second and third plurality of pulleys and secured at one end to one of the fixed block and the movable block and at another end to one of the first line and the second line. The block-and-tackle assembly can be adapted to cooperate with the pulley mechanism to transfer the upward force exerted by the spring over the first distance to the frame, wherein the force exerted by the spring over the first distance contributes to upward vertical movement of the frame over a second distance. The second distance can be greater than the first distance.

In some embodiments, the first line can be secured at one end to a top of the first lower leg, extend around a bottom of the first upper leg into and through the passage, and secured at the other end to the second lower leg. The second line can be secured at one end to a top of the second lower leg, extend around a bottom of the second upper leg into and through the passage, and secured at the other end to the first lower leg.

In some embodiments, the first line can include a first portion coupled to a second portion through a coupling member. The first portion can extend from the one end of the first line secured to the top of the first lower leg to the coupling member and the second portion can extend from the coupling member to the other end of the first line secured to the second lower leg. The third line can be secured to the first line through the coupling member.

In some embodiments, the first portion of the first line can be a belt, the second portion of the first line can be a cable, the second line can be a belt, and the third line can be a cable.

In some embodiments, the third line can be threaded between each pulley of the second and third plurality of pulleys such that a displacement of the movable block by a distance D relative to the fixed block results in the other end of the third line being displaced by a distance of at least M×D relative to the frame, where M can be the mechanical advantage provided by the block-and-tackle assembly.

In some embodiments, the second plurality of pulleys can include 5 pulleys, the third plurality of pulleys can include 5 pulleys, and the mechanical advantage can be at least 10.

In some embodiments, the fixed end of the spring can be connected to the frame through a load adjustment mechanism adapted to adjust the force exerted by the spring over the first distance by displacing the fixed end of the spring relative to its movable end.

In some embodiments, the load adjustment mechanism can include a lead screw rotatably coupled at one end to the fixed end of the spring and at the other end to a bevel gear system connected to the frame. The load adjustment mechanism can be adapted to rotate the lead screw to displace the fixed end of the spring relative to its movable end along the length of the lead screw in response to a rotation of a bevel gear of the bevel gear system.

In some examples, the table can further comprise a looking mechanism located in the passage and connected to the frame. The locking mechanism can be adapted to prevent the upward vertical movement of the frame by securely clamping at least one of the first line and the second line.

In some examples, the locking mechanism can comprise an actuator adapted to unclamp the at least one of the first line and the second line when the actuator is moved into an unlocked position and the upward force exerted by the spring on the frame is substantially equal to a downward force exerted by the frame and the work surface.

In another broad aspect, at least one embodiment described herein provides an apparatus for a height-adjustable table. The apparatus can include a frame for supporting a work surface, wherein the frame defines a passage therein; a pair of spaced apart lower legs supporting the frame; a pulley mechanism coupling the frame and the pair of lower legs for vertically moving the frame relative to the pair of lower legs; and a spring located within the passage. The spring can have a fixed end secured to the frame and a movable end movable relative to the frame over a first distance for exerting a force over the first distance. The apparatus can further include a block-and-tackle assembly located within the passage. The block-and-tackle assembly can couple the movable end of the spring to the pulley mechanism. The block-and-tackle assembly can be adapted to transfer the force exerted by the spring over the first distance to vertical movement of the frame relative to the pair of lower legs over a second distance, wherein the second distance is greater than the first distance.

In some embodiments, the pulley mechanism can include a plurality of pulleys located within the passage and a plurality of tension lines passing through the pulleys and coupling the frame and the lower legs for vertically moving the frame relative to the lower legs.

In some embodiments, the frame can include a cross-member and a pair of upper legs extending downwardly from the cross-member into the pair of lower legs, wherein the passage extends through the cross-member and the pair of upper legs.

In some embodiments, the block-and-tackle can be located within a portion of the passage in the cross-member.

In some embodiments, the second distance can be at least 10 times the first distance.

In some embodiments, the fixed end of the spring can be secured to the frame through a load adjustment mechanism for adjusting the force exerted by the spring over the first distance.

DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now briefly described.

FIG. 2 is a perspective view of an example leg sleeve of the table of FIG. 1a.

FIG. 3 is an exploded view of example components of the table of FIG. 1a.

FIG. 4a is a top view of an example load adjustment mechanism and an example spring assembly (with a spring) of the table of FIG. 1a.

FIG. 4b is a top view of the load adjustment mechanism and the spring assembly (without a spring) of FIG. 4a.

FIG. 4c is a perspective view of the load adjustment mechanism and the spring assembly of FIG. 4a.

FIG. 5 is a perspective view of an example block-and-tackle assembly of the table of FIG. 1a.

FIG. 6b is an example simplified schematic diagram of the table of FIG. 1a in a raised configuration.

FIG. 7 is a perspective sectional view from the front of the table of FIG. 1a.

FIG. 9 is a perspective view of example components of the table of FIG. 1a.

FIG. 11 is a perspective view of an example locking mechanism of the table of FIG. 1a.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures, and components have not been described in detail so as not to obscure the embodiments described herein. Furthermore, this description is not to be considered as limiting the scope of the embodiments described herein in any way, but rather as merely describing the implementation of the various embodiments described herein.

Figure 1B:
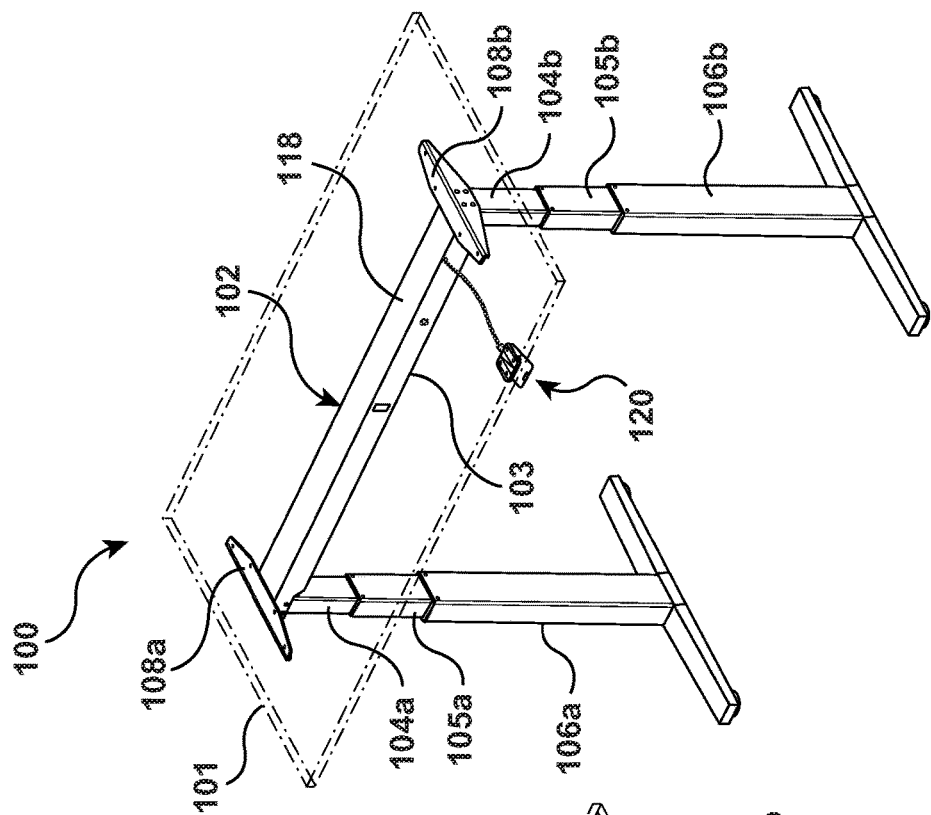
FIG. 1b is a perspective view of the table of FIG. 1a in a raised configuration.
Figure 1A:
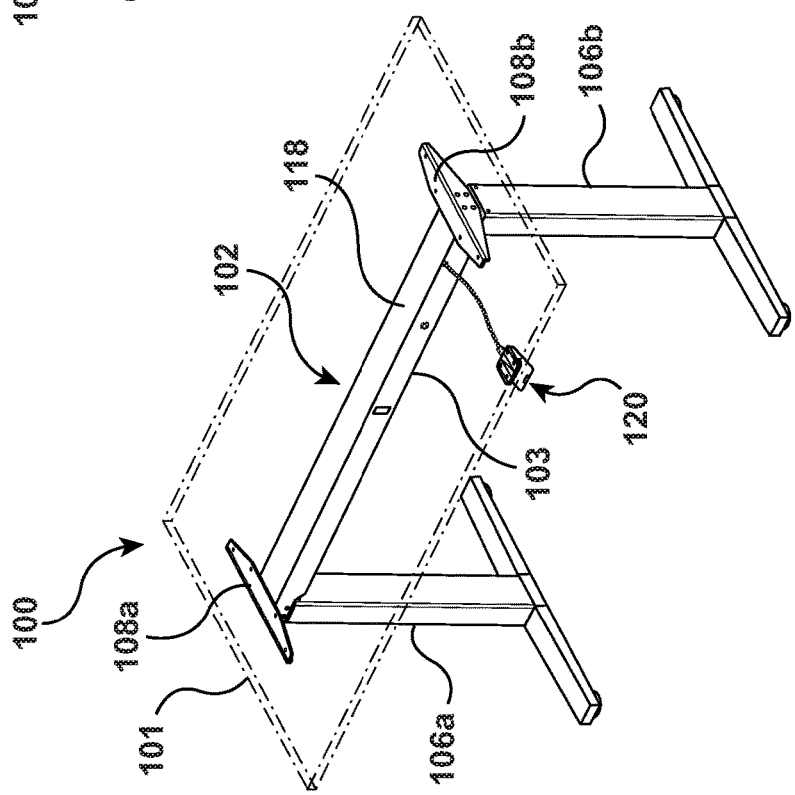
FIG. 1a is a perspective view of an example height-adjustable table in a lowered configuration.
Figure 7:
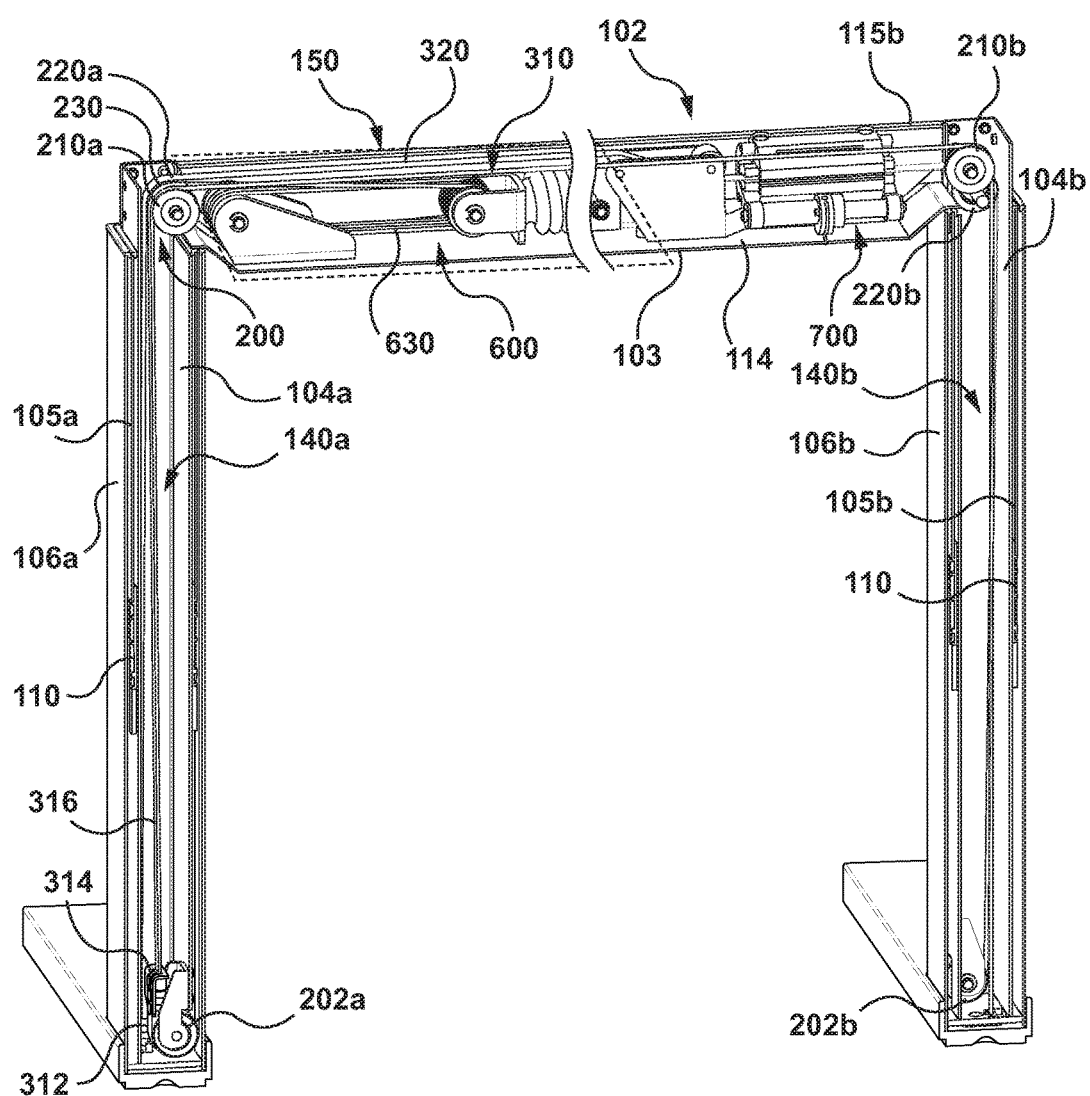
Figure 8:
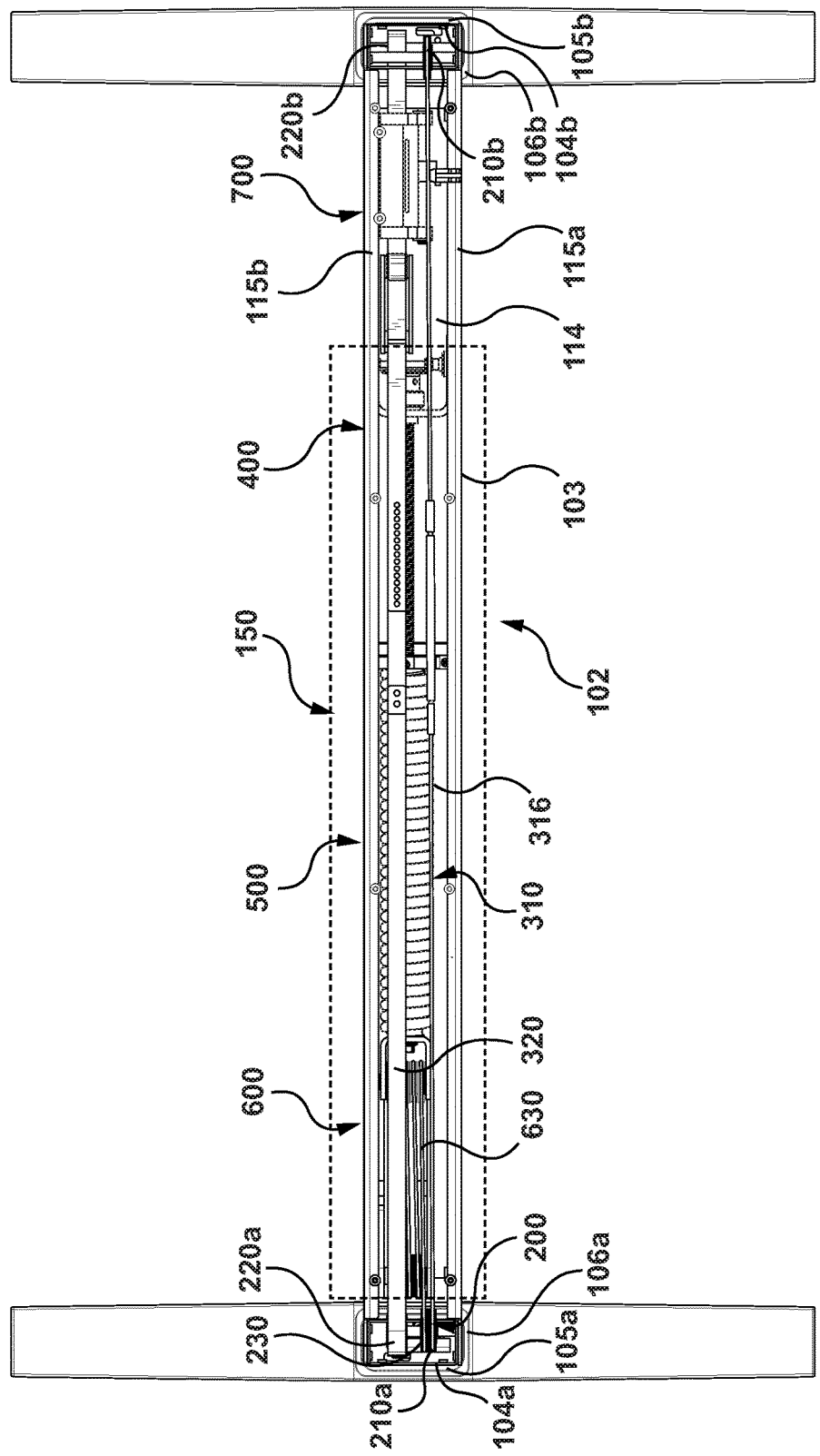
FIG. 8 is a top sectional view of the table of FIG. 1a (with the work surface removed).
Figure 9:
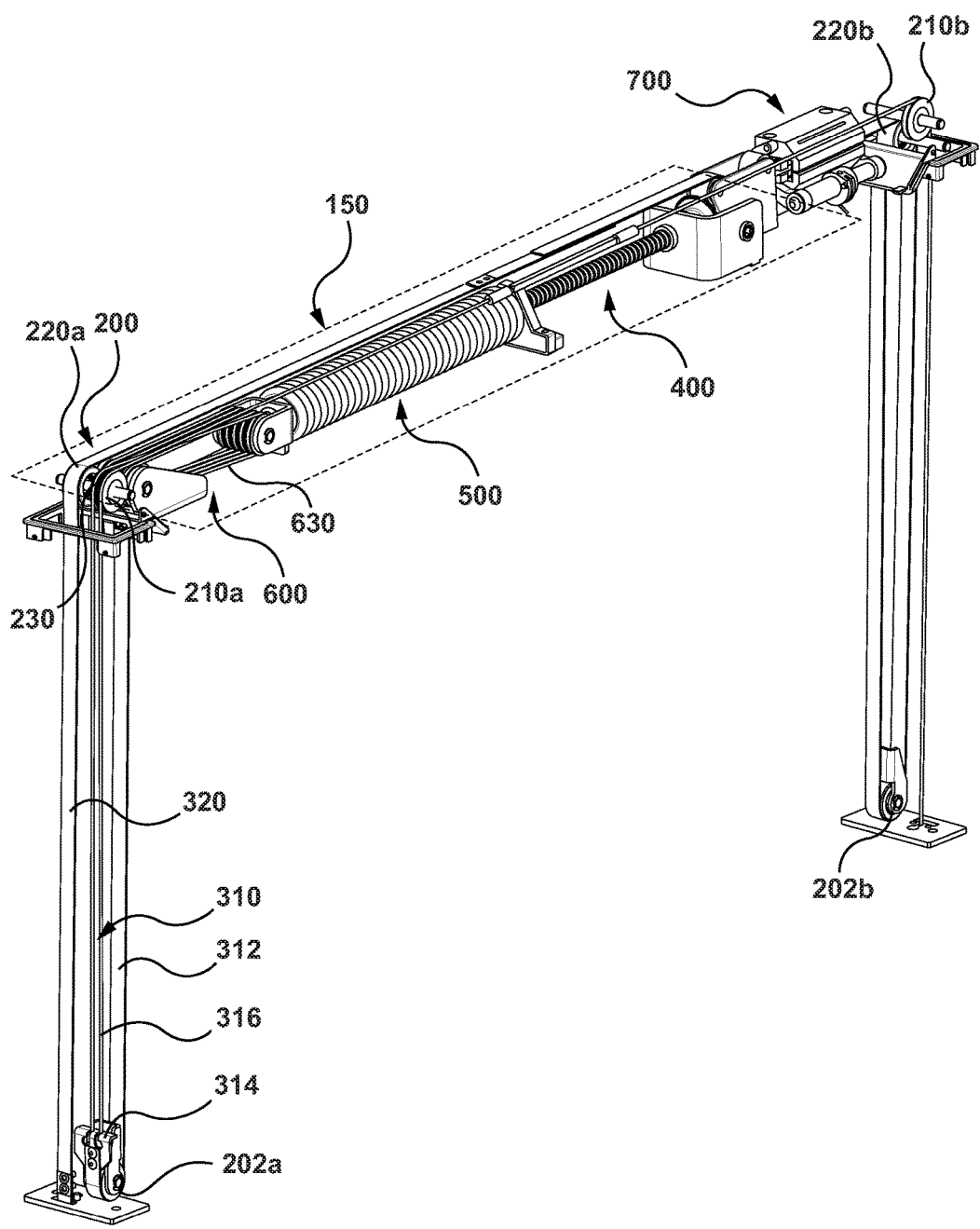
Figure 10:
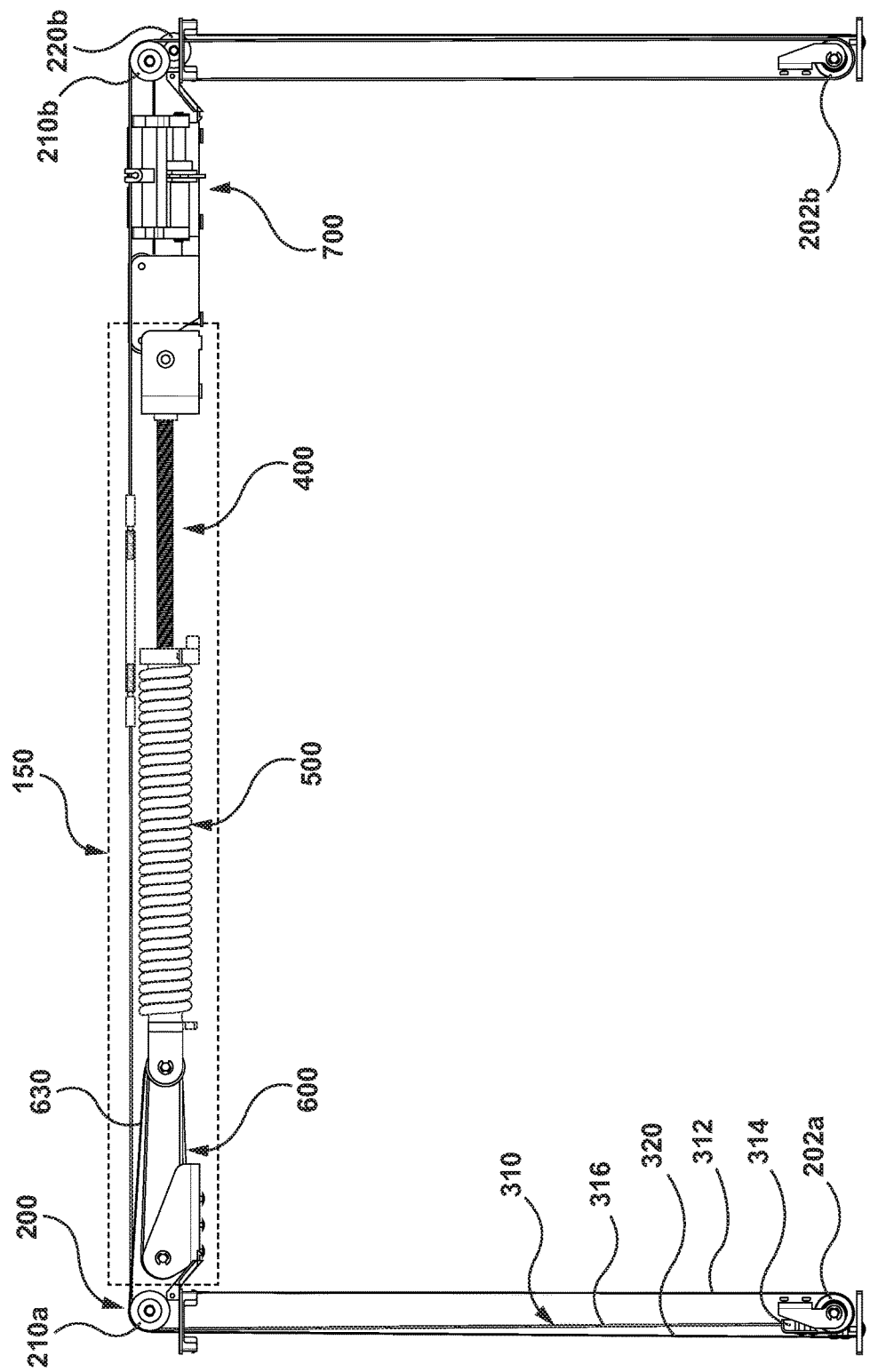
FIG. 10 is a front view of the components of FIG. 9.

FIGS. 1a and 1b show a height-adjustable table 100 in a lowered and raised configuration, respectively, according to one embodiment of the present invention. In the example illustrated, height-adjustable table 100 includes a work surface 101 supported on a vertically movable, hollow frame 102, and a pair of lower legs 106a, 106b supporting frame 102. Frame 102 includes a cross-beam 103 (also referred to as a cross-member), upper legs 104a, 104b, and work-surface support members 108a, 108b. Upper legs 104a, 104b are hollow and define interior spaces 140a, 140b (shown in FIG. 7). Upper legs 104a, 104b are fixed at their upper ends to opposing ends of cross-beam 103 and extend downwardly through upper-leg sleeves 105a, 105b into lower legs 106a, 106b, respectively.

Figure 2:
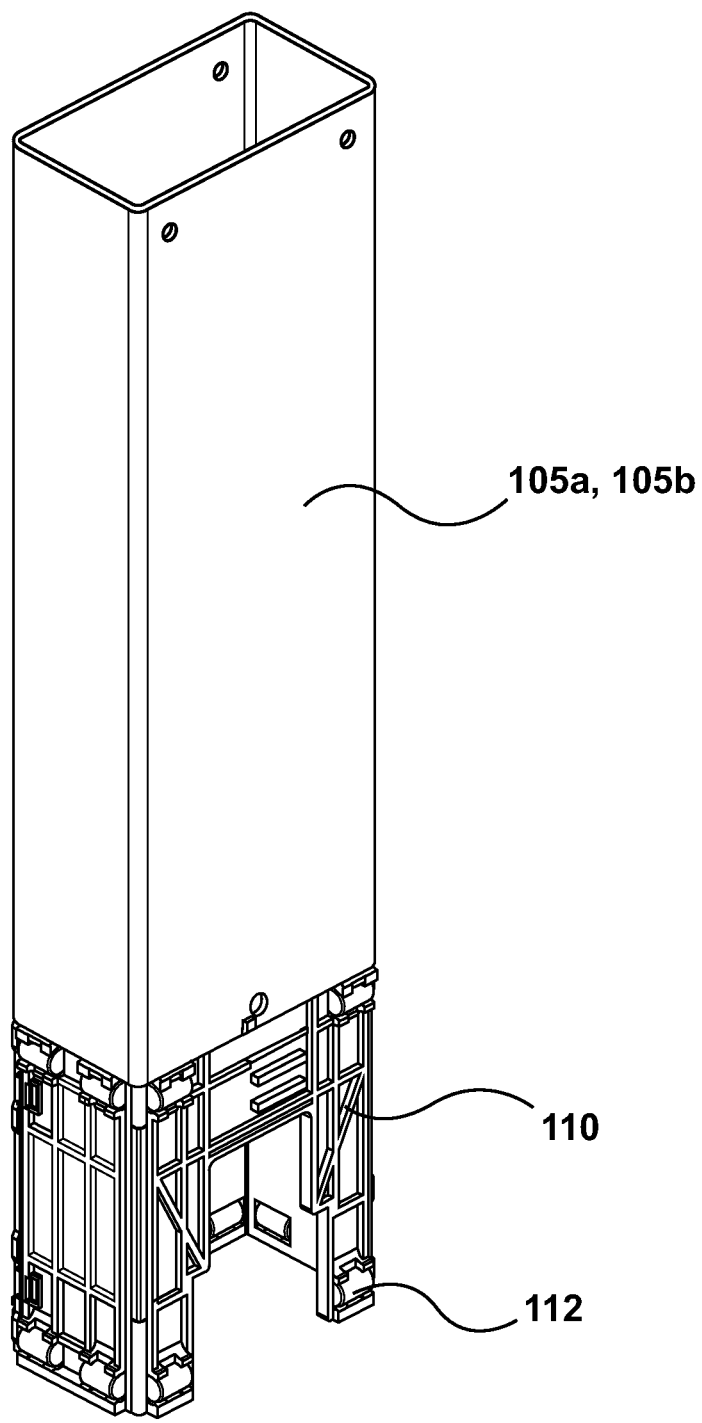

As shown in FIG. 2, in the example illustrated, each of upper-leg sleeves 105a, 105b is connected at a bottom end to a roller sleeve 110 through which upper legs 104a, 104b also extend. Roller sleeve 110 includes a plurality of rotatable rollers 112 that extend through roller sleeve 110 to simultaneously contact the outer surface of upper legs 104a, 104b and the inner surface of lower legs 106a, 106b, thereby allowing upper legs 104a, 104b to smoothly telescope within lower legs 106a, 106b. It will be appreciated that upper-leg sleeves 105a, 105b are included for aesthetic purposes, and may be omitted without affecting the ability of upper legs 104a, 104b to telescope within lower legs 106a, 106b using roller sleeves 110.

Referring back to FIG. 1b, in the example illustrated, support members 108a, 108b are secured to an upper portion of upper legs 104a, 104b, respectively, and are used to secure work surface 101 to frame 102.

In the example illustrated, height-adjustable table 100 further includes a release mechanism 120. Release mechanism 120 is secured to the underside of work surface 101, and can allow a user to release an internal locking mechanism 700 (shown in FIGS. 3 and 7-11) when the user wishes to vertically move (i.e., raise or lower) frame 102. The operation of release mechanism 120 and locking mechanism 700 will be described in further detail below with reference to FIG. 11.

Figure 3:
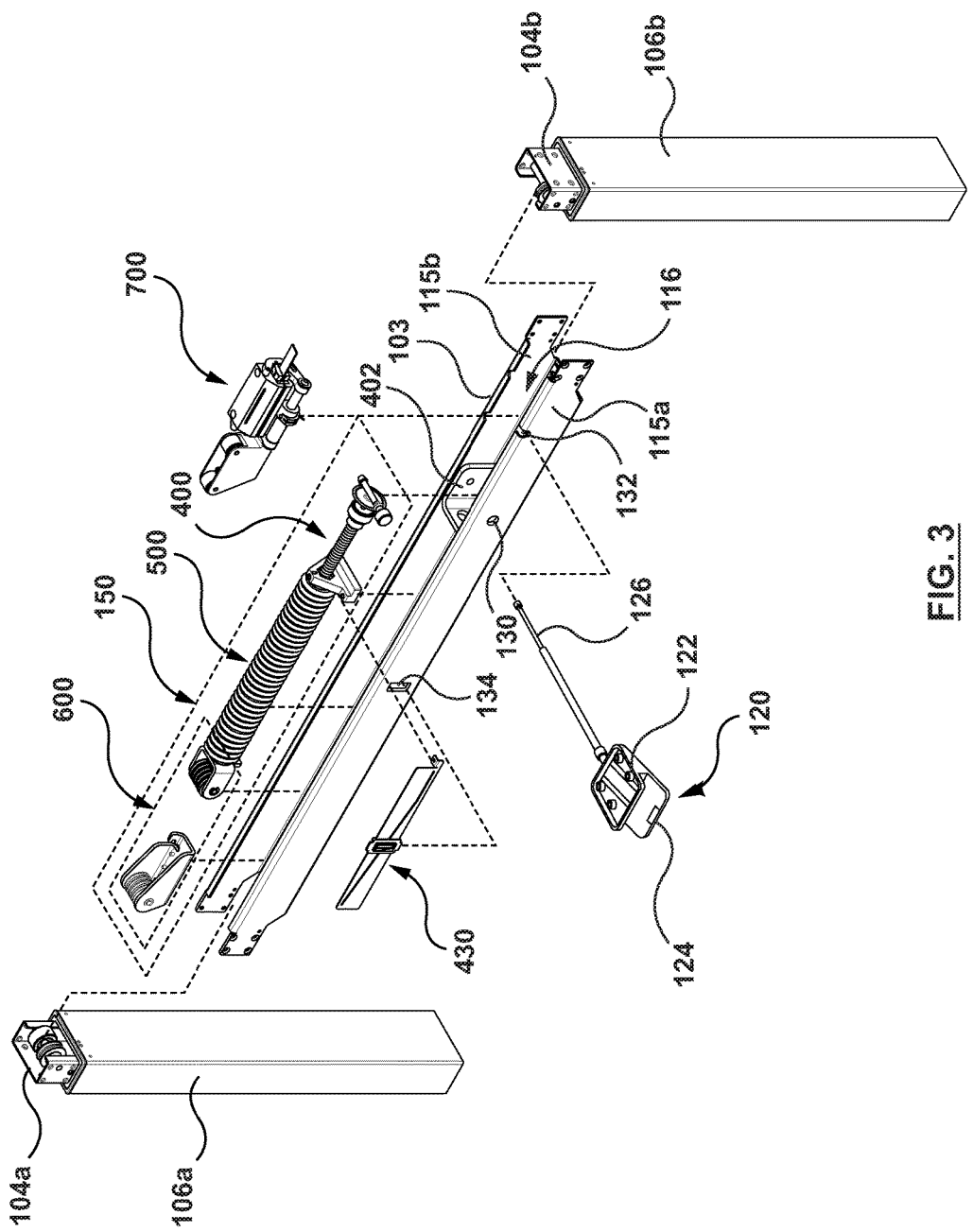

Referring to FIG. 3, in the example illustrated, cross-beam 103 preferably has a generally horizontal base 114 (shown in FIGS. 7 and 8) and two side walls 115a, 115b extending substantially perpendicular to base 114. When connected, base 114 and side walls 115a, 115b form an interior space 116. Interior space 116 of cross-beam 103 and interior spaces 140a, 140b of upper legs 104a, 104b define a passage running through the interior of left upper leg 104a, cross-beam 103, and right upper leg 104b.

A counter-balance mechanism 150 is located within the interior space 116 and a pulley mechanism 200 (shown in FIGS. 6 to 10) is located within the passage. Pulley mechanism 200 cooperates with counter-balance mechanism 150 to assist in moving frame 102 relative to lower legs 106a, 106b. Counter-balance mechanism 150 includes a load adjustment mechanism 400, a spring assembly 500, and a block-and-tackle mechanism 600. The spring assembly 500 extends between load adjustment mechanism 400 and block-and-tackle assembly 600. When work surface 101 and frame 102 are assembled, counter-balance mechanism 150 is hidden in the interior of cross-beam 103. It will be appreciated that cross-beam 103 can optionally include a top cover 118 (shown in FIGS. 1a and 1b) to hide counter-balance mechanism 150 when work surface 101 is removed.

Figure 4C:
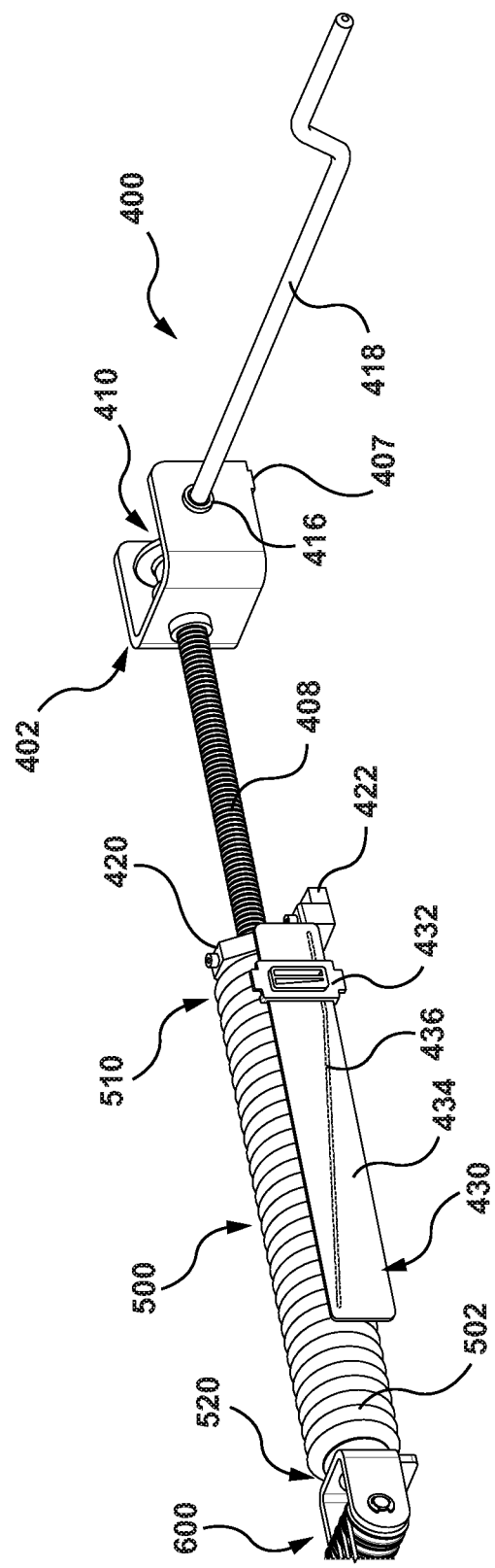

As shown in FIGS. 4a to 4c, in the example illustrated, load adjustment mechanism 400 includes a generally U-shaped bracket 402 having a side portion 404 and two spaced apart flanges 405, 406 extending from opposing ends of side portion 404. The bottom of each flange 405, 406 includes notch 407 (shown in FIG. 4c) which is used to secure bracket 402 to cross-beam 103 by being inserted into corresponding holes (not shown) located in base 114 of cross-beam 103.

Bracket 402 houses bevel gear mechanism 410. Bevel gear mechanism 410 includes driving gear 412 which is meshed at a 90° angle with driven gear 414. Driving gear 412 is connected to rotatable shaft 413 that is supported by and extends between flanges 405, 406. One end of shaft 413 is rotatably inserted into a hole in flange 405. The other end of shaft 413 is fixed to rotatable crank coupler 416, which extends through, and protrudes from the outer surface of, flange 406. The protruding portion of crank coupler 416 is used to further secure bracket 402 to cross-beam 103 by extending through hole 130 (shown in FIG. 3) of cross-beam 103, and receives an engagement end of crank 418. When the engagement end of crank 418 is inserted into crank coupler 416, a rotation of crank 418 results in a rotation of driving gear 412, which in turn engages and rotates driven gear 414.

Continuing to refer to FIGS. 4a to 4c, in the example illustrated, driven gear 414 is fixed to one end of rotatable lead-screw coupler 417, which extends through side portion 404 of bracket 402. The other end of lead-screw coupler 417 is fixed to one end of lead screw 408. Lead screw 408 extends toward spring assembly 500 and is threaded through sliding member 420. Sliding member 420 includes a base 422 which slides along the longitudinal axis of cross-beam 103. Driven gear 414, lead screw 408, and sliding member 420 are configured such that a rotation of driven gear 414 rotates lead screw 408, resulting in sliding member 420 moving along the length of lead screw 408.

Sliding member 420 is coupled to one end of spring assembly 500. Spring assembly 500 preferably includes a helical tension spring 502 extending between grooved plugs 512, 522. Grooved plug 512 is secured at one end to sliding member 420, and extends into the core of spring 502 at fixed end 510. As best shown in FIG. 4b, grooved plug 512 has helical grooves adapted to grip the coils of spring 502 to secure fixed end 510 of spring 502 to sliding member 420. Spring 502 extends along the longitudinal axis of cross-beam 103 and is secured at its movable end 520 to one end of grooved plug 522, which also has helical grooves adapted to grip the coils of spring 502.

Figure 5:
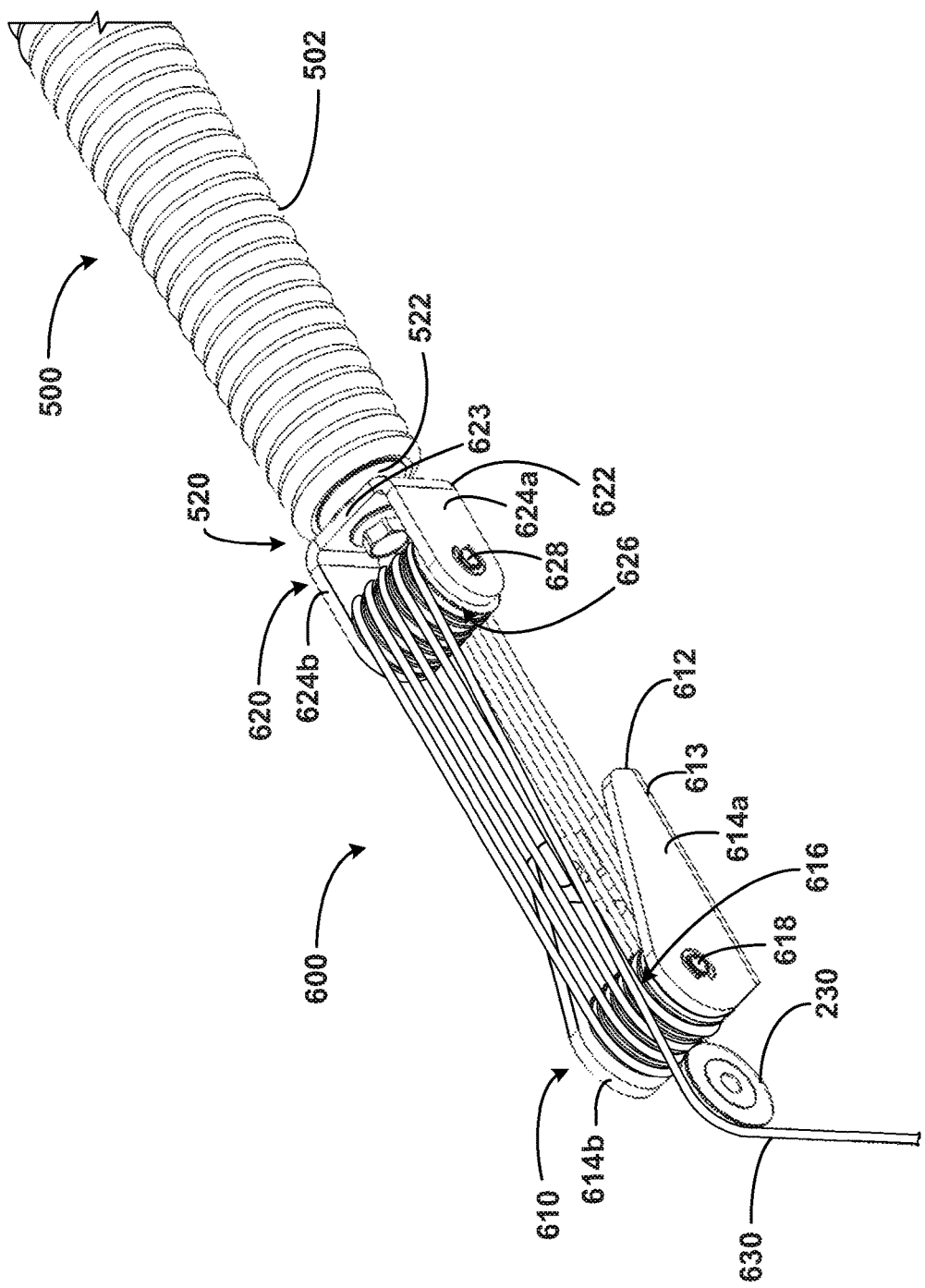

As shown in FIG. 5, in the example illustrated, the other end of grooved plug 522 is fixed to block-and-tackle assembly 600. Block-and-tackle assembly 600 includes fixed block 610, movable block 620, and tension line 630. Movable block 620 includes bracket 622 and a set of pulleys 626. Bracket 622 includes a side portion 623 to which grooved plug 522 is fixed, and two spaced apart flanges 624a, 624b extending away from opposing ends of side portion 623. Pulleys 626 are rotatably mounted on a shaft 628 extending between flanges 624a, 624b of bracket 622.

Fixed block 610 includes bracket 612 and a set of pulleys 616. Bracket 612 includes a base portion 613 that is fixed to base 114 of cross-beam 103, and two flanges 614a, 614b extending upwards away from opposing ends of base portion 613. Pulleys 616 are rotatably mounted on a shaft 618 extending between flanges 614a, 614b of bracket 612.

In the example illustrated, line 630 is secured at one end to bracket 612 of fixed block 610. Alternatively, the one end of line 630 can be secured to bracket 622 of movable block 620. Line 630 is threaded between each pulley of pulleys 616 and 626 and extends into the portion of the passage defined by left upper leg 104a, to be coupled to pulley mechanism 200.

Figure 6A:
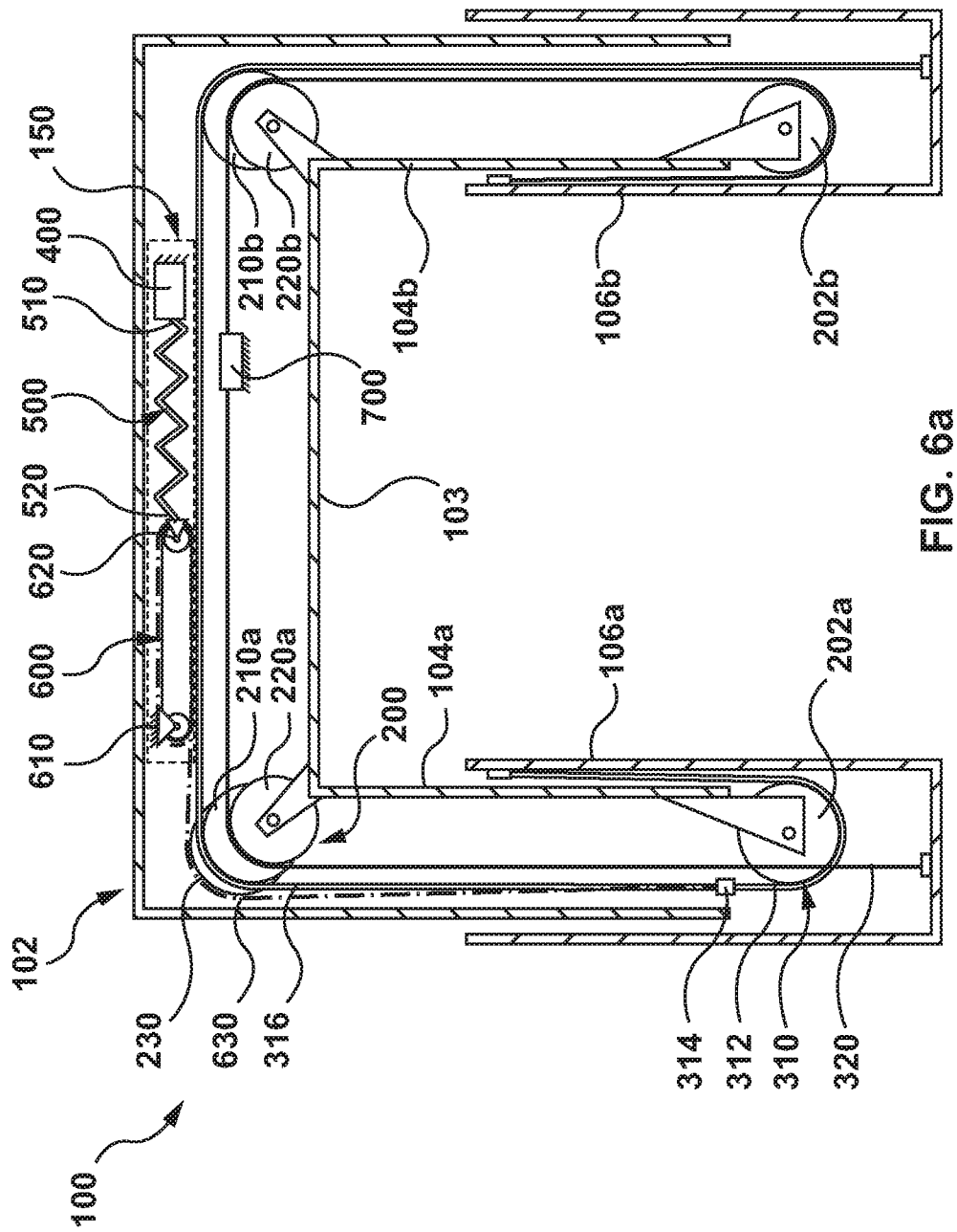
FIG. 6a is an example simplified schematic diagram of the table of FIG. 1a in a lowered configuration.

Referring to FIGS. 6a and 6b (which illustrate a simplified schematic of height-adjustable table 100) and FIGS. 7 to 10, pulley mechanism 200 includes a number of pulleys and tension lines which transfer the load from counter-balance mechanism 150 to frame 102, and synchronize the lifting of upper legs 104a, 104b.

In the example illustrated, pulley mechanism 200 includes a tension line 310 passing through pulleys 202a, 210a, and 210b and adapted to lift left upper leg 104a, and a tension line 320 passing through pulleys 202b, 220b, and 220a and adapted to synchronize the lifting of right upper leg 104b with the lifting of left upper leg 104a. Pulleys 202a, 202b are secured to frame 102 in the lower portion of the passage defined by upper legs 104a, 104b, respectively. Pulleys 210a and 220a are secured to frame 102 in the upper portion of the passage defined by left upper leg 104a, and pulleys 210b and 220b are secured to frame 102 in the upper portion of the passage defined by right upper leg 104b.

In the example illustrated, line 320 is secured at one end to the top of right lower leg 106b and extends vertically to pulley 202b between the inner surface of right lower leg 106b and the outer surface of right upper leg 104b. Line 320 is deflected by pulley 202b around the bottom of right upper leg 104b, extends vertically to pulley 220b through the portion of the passage defined by right upper leg 104b, is deflected by pulley 220b, extends horizontally to pulley 220a through the portion of the passage defined by cross-beam 103, is deflected by pulley 220a, and extends vertically through the portion of the passage defined by left upper leg 104a. The other end of line 320 is secured to the base of left lower leg 106a.

Similarly, in the example illustrated, line 310 is secured at one end to the top of left lower leg 106a and extends vertically to pulley 202a between the inner surface of left lower leg 106a and the outer surface of left upper leg 104a. Line 310 is deflected by pulley 202a around the bottom of left upper leg 104a, extends vertically to pulley 210a through the portion of the passage defined by left upper leg 104a, is deflected by pulley 210a, extends horizontally to pulley 210b through the portion of the passage defined by cross-beam 103, is deflected by pulley 210b, and extends vertically through the portion of the passage defined by right upper leg 104b. The other end of line 310 is secured to the base of right lower leg 106b.

Line 310 preferably consists of a first portion 312 and a second portion 316 connected through a coupling member 314 disposed within the portion of the passage defined by left upper leg 104a. First portion 312 extends between the one end of line 310 secured to the top of left lower leg 106a and coupling member 314, and second portion 316 extends between coupling member 314 and the end of line 310 secured to the base of right lower leg 106b.

Pulley mechanism 200 further includes pulley 230, which is secured to frame 102 in the upper portion of the passage defined by left upper leg 104a. Line 630 extends from block-and-tackle assembly 600 to pulley 230, is deflected by pulley 230, and extends vertically to coupling member 314 through the passage defined by left upper leg 104a. Line 630 is coupled at its other end to line 310 through coupling member 314, to transfer loads exerted by spring assembly 500 to pulley mechanism 200.

It will be appreciated that lines 310, 320, and 630 can be any elongated flexible members capable of conveying force through tension. For example, lines 310, 320, 630 can be belts, cables, ropes, wires, chains, etc. In the example illustrated, first portion 312 of line 310 is a steel belt, second portion 316 of line 310 is a cable, line 320 is a steel belt, and line 630 is a cable.

Referring to FIG. 11, in the example illustrated, height-adjustable table 100 includes a locking mechanism 700. Locking mechanism 700 includes a clamping mechanism 710, a deflection frame 720, and a mechanical actuator 730. Deflection frame 720 is connected to clamping mechanism 710 and houses two rollers 722. Rollers 722 deflect line 320 into a passage running between opposed clamping members 712 of clamping mechanism 710.

In the example illustrated, clamping mechanism 710 is secured to base 114 of cross-beam 103, and can be biased in a locked position in which clamping members 712 securely clamp line 320 to prevent line 320 from moving relative to frame 102. As a result of the configuration of pulley mechanism 200, securely clamping, line 320 prevents frame 102 from vertically moving relative to lower legs 106a, 106b. In some embodiments, locking mechanism 700 may be replaced or supplemented with a similar locking mechanism configured to clamp line 310 in place of or in addition to line 320 to prevent frame 102 from vertically moving relative to lower legs 106a, 106b.

Referring back to FIG. 3, in the example illustrated, locking mechanism 700 is coupled to release mechanism 120. The release mechanism 120 includes a paddle 122, a mounting portion 124, and an actuator cable 126. Mounting portion 124 is used to mount release mechanism 120 to the underside of work surface 101 (as shown in FIGS. 1a and 1b). An edge of paddle 122 is connected through a spring-biased hinge to mounting portion 124, to allow paddle 122 to pivot about the connected edge when pressed upward toward mounting portion 124, and to return to a downwardly biased position when released. One end of cable 126 is coupled to mounting portion 124, while the other end extends through hole 132 into the portion of the passage defined by cross-beam 103, is deflected downwards, and is coupled to mechanical actuator 730 (shown in FIG. 11) of locking mechanism 700.

Cable 126 is retractable into mounting portion 124 in response to a user operating paddle 122 by pressing it toward mounting portion 124. Referring to FIG. 11, when retracted, cable 126 pulls upward on mechanical actuator 730. When pulled upward, mechanical actuator 730 can manipulate clamping mechanism 710 to bring clamping members 712 into an unlocked configuration, in which line 320 is free to slide between clamping members 712.

When released, paddle 122 returns to its original position, resulting in cable 126 extending back out from mounting portion 124. In response, mechanical actuator 730 returns to its original downwardly biased position, resulting in clamping members 712 returning to the locked configuration in which line 320 is securely clamped.

The operation of an embodiment of height-adjustable table 100 will now be described. Referring back to FIGS. 4a to 4c, in the example illustrated, a user can insert crank 418 into, and rotate, crank coupler 416. A rotation of crank coupler 416 results in a rotation of driving gear 412, which in turn rotates driven gear 414 and lead screw 408. A rotation of lead screw 408 results in sliding member 420, and in turn fixed end 510 of spring 502, being displaced relative to movable end 520 of spring 502 along the length of lead screw 408. Accordingly, by rotating crank coupler 416 using crank 418, a user can increase or decrease the length of spring 502, and in turn, adjust the load that spring 502 exerts on block-and-tackle assembly 600.

In one aspect, height-adjustable table 100 may include a load indicator assembly 430. Load indicator assembly 430 indicates the displacement of movable end 520 of spring 502 relative to its fixed end 510, thereby giving an indication of the load being applied to spring 502.

Referring to FIGS. 3 and 4c, in the example illustrated, load indicator assembly 430 may include a load viewing plate 432 and a load indicator plate 434 having a load indicator stripe 436. Load indicator plate 434 is disposed within the interior space 116 against side wall 115a of cross-beam 103, is fixed at one end to sliding member 420, and extends along the length of spring 502. Stripe 436 slopes upwardly from the end of load indicator plate 434 fixed to sliding member 420 to the opposing end of load indicator plate 434. Load viewing plate 432 is disposed in slot 134 (shown in FIG. 3) of side wall 115a of cross-beam 103. Load viewing plate 432 includes a vertical aperture through which stripe 436 can be viewed.

In operation, load indicator plate 434 moves with sliding member 420 as a user adjusts the length of spring 502 using crank 418. Accordingly, as the length of spring 502 is increased, load indicator plate 434 is displaced relative to the aperture of load viewing plate 432. As load indicator plate 434 is displaced, a user will see stripe 436 rising relative to the aperture of load viewing plate 432, thereby indicating to the user the relative load being applied to spring 502.

Referring to FIGS. 6a and 6b, in the example illustrated, the load exerted by spring 502 is transferred through block-and-tackle assembly 600 to pulley mechanism 200, to assist in vertically moving frame 102 relative to lower legs 106a, 106b. Block-and-tackle assembly 600 operates to smooth the load curve of spring 502. In this way, a small displacement of movable end 520 of spring 502 relative to its fixed end 510 can result in a relatively large vertical displacement of frame 102.

Specifically, when loaded, spring 502 cooperates with block-and-tackle assembly 600 and pulley mechanism 200 to exert an upward force over a distance D on frame 102. Block-and-tackle assembly 600 operates to reduce the force exerted by spring 502 over the distance D on frame 102 by a factor of M, where M is the mechanical advantage provided by block-and-tackle assembly 600. In exchange for a reduction in force, the force exerted by spring 502 over the distance D can contribute to upward vertical movement of frame 102 over a distance M×D.

The mechanical advantage M provided by block-and-tackle assembly 600 can depend on the configuration of and number of pulleys in the sets of pulleys 616, 626, and the manner in which line 630 is threaded through pulleys 616, 626. In the example illustrated, the set of pulleys 616 includes 5 pulleys, the set of pulleys 626 includes 5 pulleys, and line 630 is threaded through each pulley of pulleys 616, 626 such that 10 line segments extend between fixed block 610 and movable block 620, as shown in FIG. 5. In such a configuration, the mechanical advantage M provided by block-and-tackle assembly 600 is 10. In other examples, a different number of pulleys can be provided in one or both of the sets of pulleys 616, 626, and the mechanical advantage M may be greater or less than 10.

As mentioned above, locking mechanism 700 can operate to prevent frame 102 from moving vertically by securely clamping line 320. When a user wishes to raise or lower frame 102, the user can operate paddle 122 to unclamp line 320. However, if the upward force exerted by spring 502 on frame 102 is substantially greater or less than the downward force exerted by frame 102 and work surface 101, unclamping line 320 may result in a sudden upward or downward movement of frame 102. Accordingly, locking mechanism 700 can be configured to unclamp line 320 only if appropriate load conditions are present, such as when the upward force exerted by spring 502 on frame 102 is substantially equal to the downward force exerted by frame 102 and work surface 101.

If the load conditions are not appropriate, clamping mechanism 710 can disengage from mechanical actuator 730, such that clamping members 712 will remain in the locked configuration despite a user operating paddle 122. In this case, if the user wishes to raise or lower frame 102, the user can manipulate crank 418 to increase or decrease the load applied to spring 502 to ensure appropriate load conditions are present. If appropriate load conditions are present, mechanical actuator 730 becomes operable to manipulate clamping mechanism 710 to bring clamping members 712 into the unlocked configuration, and the user can operate paddle 122 to unclamp line 320. The upward forces exerted by spring 502 on frame 102 can then assist the user in lifting frame 102 relative to lower legs 106a, 106b.

The embodiments described above may provide a number of advantages. Specifically, the described embodiments may provide an improved counter balance to the work surface load by providing a smoother load curve that operates over a greater range of movement of the frame. In addition, housing the components of the counter-balance mechanism in a vertically movable frame may provide a more pleasing aesthetic appearance and additional leg space over prior art designs that house components in a fixed cross-beam.

While the present invention as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims.

The invention claimed is:

1. An apparatus for a height-adjustable table, the apparatus comprising:
   a) a frame for supporting a work surface, the frame defining a passage therein;
   b) a pair of spaced apart lower legs for supporting the frame;
   c) a pulley mechanism coupling the frame and the lower legs for vertically moving the frame relative to the lower legs;
   d) a spring located within the passage, the spring having a fixed end secured to the frame and a movable end movable relative to the frame over a first distance for exerting a force over the first distance; and
   e) a block-and-tackle assembly located within the passage and vertically movable with the frame relative to the lower legs, the block-and-tackle assembly including a fixed block and a movable block, the fixed block having a plurality of fixed block pulleys and the movable block having a plurality of movable block pulleys, the block-and-tackle assembly further including a block-and-tackle tension line threaded between the fixed and movable block pulleys and coupling the movable end of the spring to the pulley mechanism for transferring the force exerted by the spring over the first distance to upward vertical movement of the frame relative to the lower legs over a second distance, wherein the second distance is greater than the first distance,
   wherein the pulley mechanism comprises a plurality of pulley-mechanism pulleys located within the passage, and a plurality of pulley-mechanism tension lines passing through the pulley-mechanism pulleys and coupling the frame and the lower legs for vertically moving the frame relative to the lower legs, the block-and-tackle tension line coupling the movable end of the spring to one of the pulley-mechanism tension lines, and
   wherein at least a portion of the respective pulley-mechanism tension line comprises a belt, and the block-and-tackle tension line comprises a cable secured to the belt through a coupling member.

2. The apparatus of claim 1 further comprising a locking mechanism connected to the frame, the locking mechanism configurable between a locked configuration in which at least one of the pulley-mechanism tension lines is clamped for inhibiting vertical movement of the frame relative to the lower legs, and an unlocked configuration in which the at least one of the pulley-mechanism tension lines is unclamped for permitting vertical movement of the frame relative to the lower legs, the locking mechanism configurable to the unlocked configuration only if an upward force exerted by the spring on the frame via the pulley mechanism is generally equal to a downward force exerted by the frame.

3. The apparatus of claim 1, wherein the frame includes a cross-member and a pair of upper legs extending downwardly from the cross-member into the pair of lower legs, the passage extending through the cross-member and the pair of upper legs, and wherein the block-and-tackle assembly is located within a portion of the passage in the cross-member.

4. The apparatus of claim 1, wherein the second distance is at least 10 times the first distance.

5. The apparatus of claim 1, wherein the fixed end of the spring is secured to the frame through a load adjustment mechanism for adjusting the force exerted by the spring over the first distance.

6. An apparatus for a height-adjustable table, the apparatus comprising:
  a) a frame for supporting a work surface, the frame defining a passage therein;
  b) a pair of spaced apart lower legs for supporting the frame;
  c) a pulley mechanism coupling the frame and the lower legs for vertically moving the frame relative to the lower legs;
  d) a spring located within the passage, the spring having a fixed end secured to the frame and a movable end movable relative to the frame over a first distance for exerting a force over the first distance;
  e) a block-and-tackle assembly located within the passage and vertically movable with the frame relative to the lower legs, the block-and-tackle assembly including a fixed block and a movable block, the fixed block having a plurality of fixed block pulleys and the movable block having a plurality of movable block pulleys, the block-and-tackle assembly further including a block-and-tackle tension line threaded between the fixed and movable block pulleys and coupling the movable end of the spring to the pulley mechanism for transferring the force exerted by the spring over the first distance to upward vertical movement of the frame relative to the lower legs over a second distance, wherein the second distance is greater than the first distance,
  wherein the pulley mechanism comprises a plurality of pulley-mechanism pulleys located within the passage, and a plurality of pulley-mechanism tension lines passing through the pulley-mechanism pulleys and coupling the frame and the lower legs for vertically moving the frame relative to the lower legs, the block-and-tackle tension line coupling the movable end of the spring to one of the pulley-mechanism tension lines; and
  f) a locking mechanism connected to the frame, the locking mechanism configurable between a locked configuration in which at least one of the pulley-mechanism tension lines is clamped for inhibiting vertical movement of the frame relative to the lower legs, and an unlocked configuration in which the at least one of the pulley-mechanism tension lines is unclamped for permitting vertical movement of the frame relative to the lower legs, the locking mechanism configurable to the unlocked configuration only if an upward force exerted by the spring on the frame via the pulley mechanism is generally equal to a downward force exerted by the frame.

7. The apparatus of claim 6, wherein the frame includes a cross-member and a pair of upper legs extending downwardly from the cross-member into the pair of lower legs, the passage extending through the cross-member and the pair of upper legs, and wherein the block-and-tackle assembly is located within a portion of the passage in the cross-member.

8. The apparatus of claim 6, wherein the second distance is at least 10 times the first distance.

9. The apparatus of claim 6, wherein the fixed end of the spring is secured to the frame through a load adjustment mechanism for adjusting the force exerted by the spring over the first distance.

* * * * *